(No Model.) 3 Sheets—Sheet 1.

N. P. LEWIS.
COMBINED HARROW AND CULTIVATOR.

No. 487,848. Patented Dec. 13, 1892.

Witnesses:
J. B. McGirr.
M. J. McMahon.

Inventor:
Nathan P. Lewis
by his Attorney J. R. Littell (No Model.)  3 Sheets—Sheet 2.

N. P. LEWIS.
COMBINED HARROW AND CULTIVATOR.

No. 487,848.  Patented Dec. 13, 1892.

Witnesses:
J. B. McGirr.
M. J. McMahon,

Inventor:
Nathan P. Lewis
by his Attorney
J. R. Littell (No Model.) 3 Sheets—Sheet 3.
N. P. LEWIS.
COMBINED HARROW AND CULTIVATOR.
No. 487,848. Patented Dec. 13, 1892.
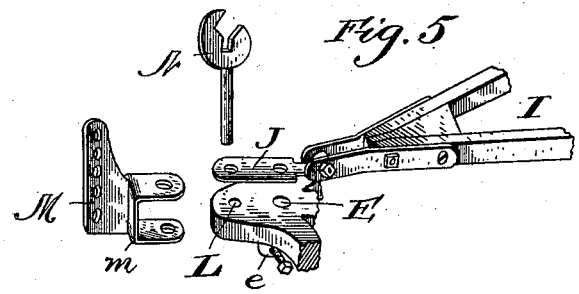
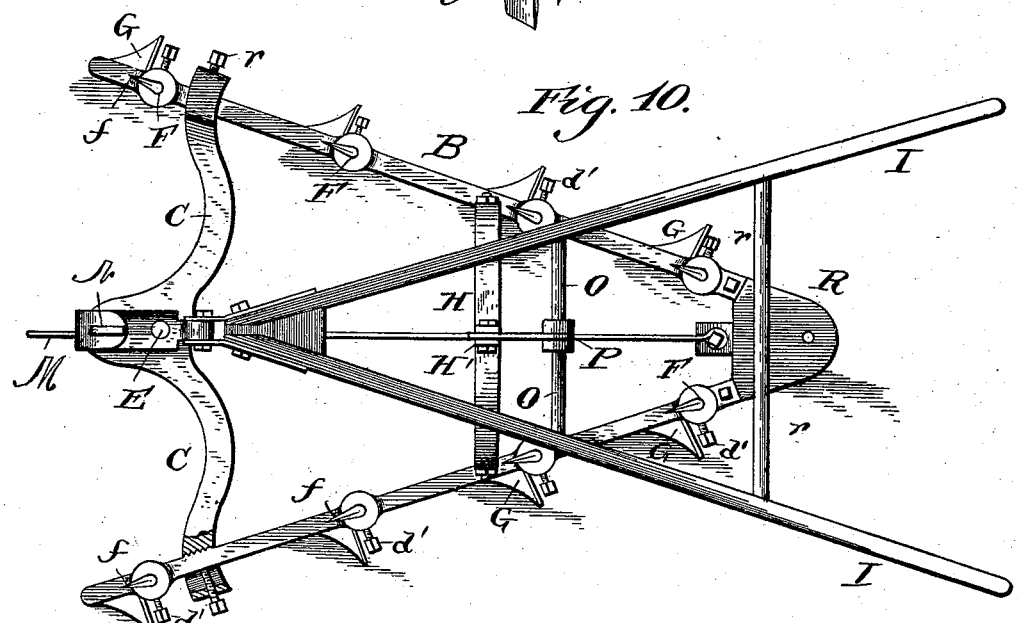

UNITED STATES PATENT OFFICE.

NATHAN P. LEWIS, OF HUTCHINS, MISSISSIPPI.

COMBINED HARROW AND CULTIVATOR.

SPECIFICATION forming part of Letters Patent No. 487,848, dated December 13, 1892.

Application filed June 17, 1892. Serial No. 437,051. (No model.)

*To all whom it may concern:*

Be it known that I, NATHAN P. LEWIS, a citizen of the United States, residing at Hutchins, in the county of Adams and State of Mississippi, have invented certain new and useful Improvements in a Combined Harrow and Cultivator; and I do hereby declare that the following is a full, clear, and exact description of the invention, which will enable others skilled in the art to which it appertains to make and use the same.

This invention relates to combined harrows and cultivators; and it has for its object to provide simple and improved reversible-draft appliances whereby the implement can be operated in either direction, according to the offices to which it is to be applied.

A further object of the invention is to provide, in combination with an implement of this character, simple and improved adjustable and reversible tools, and also to produce a device possessing advantages in point of inexpensiveness and durability in construction and general efficiency.

Figure 1:
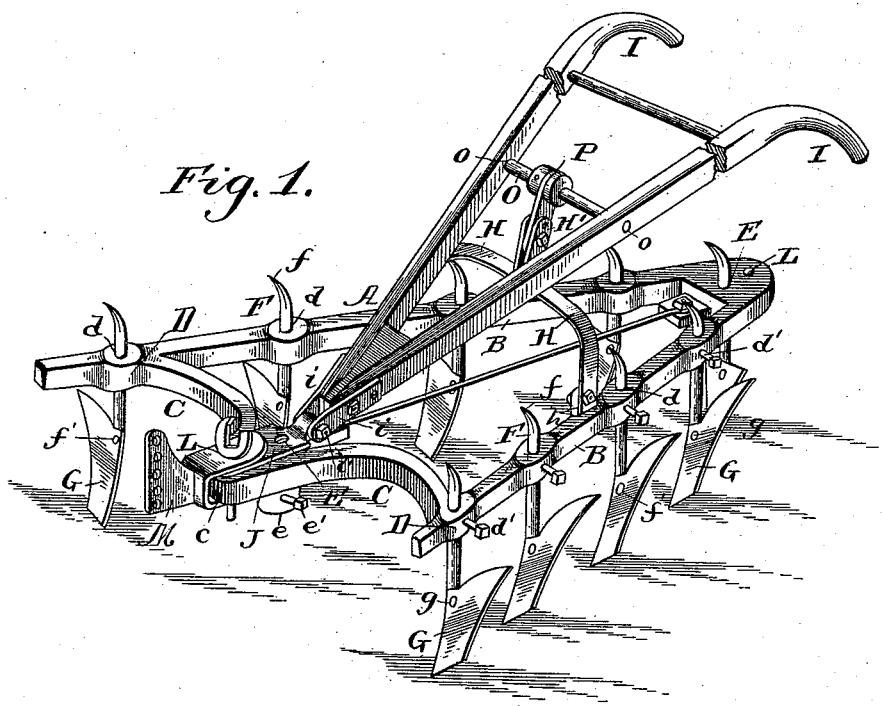
Figure 2:
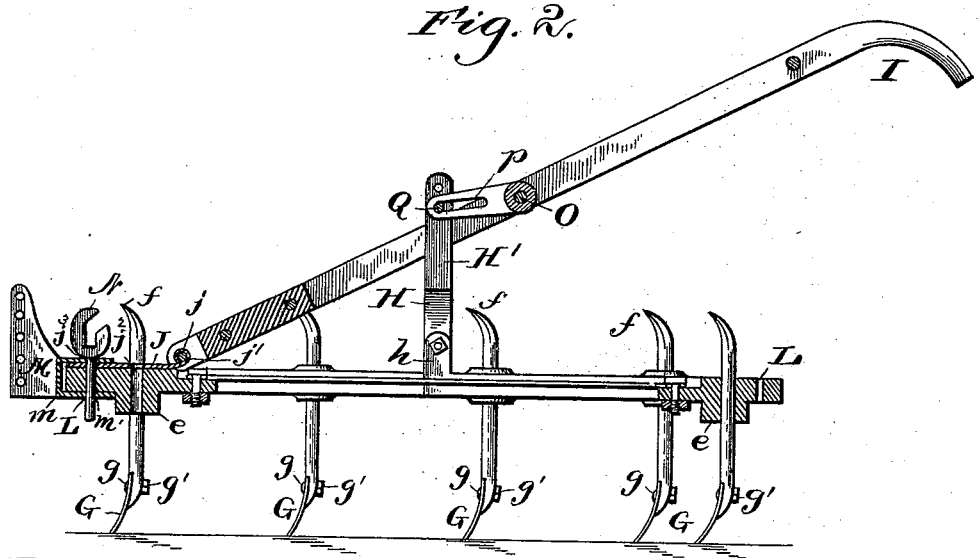
Figure 3:
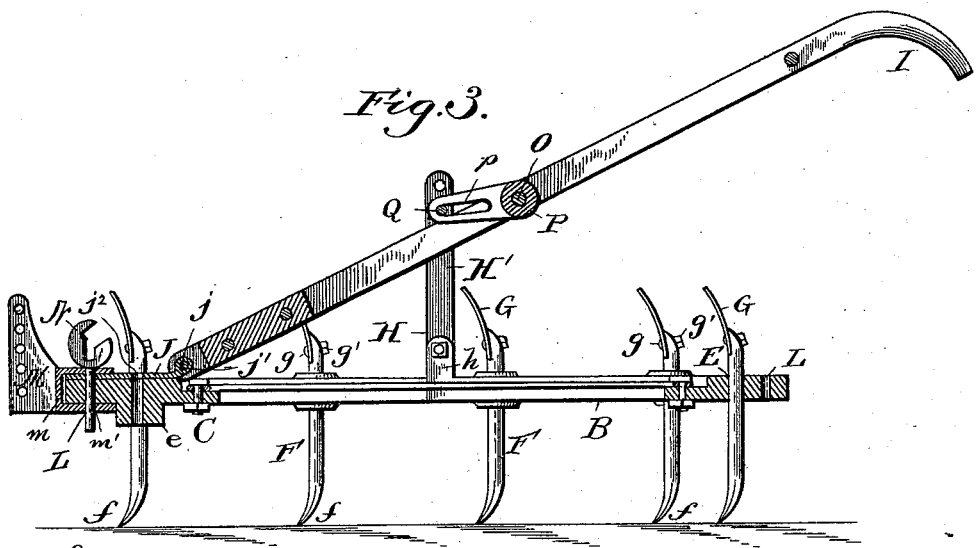
Figure 4:
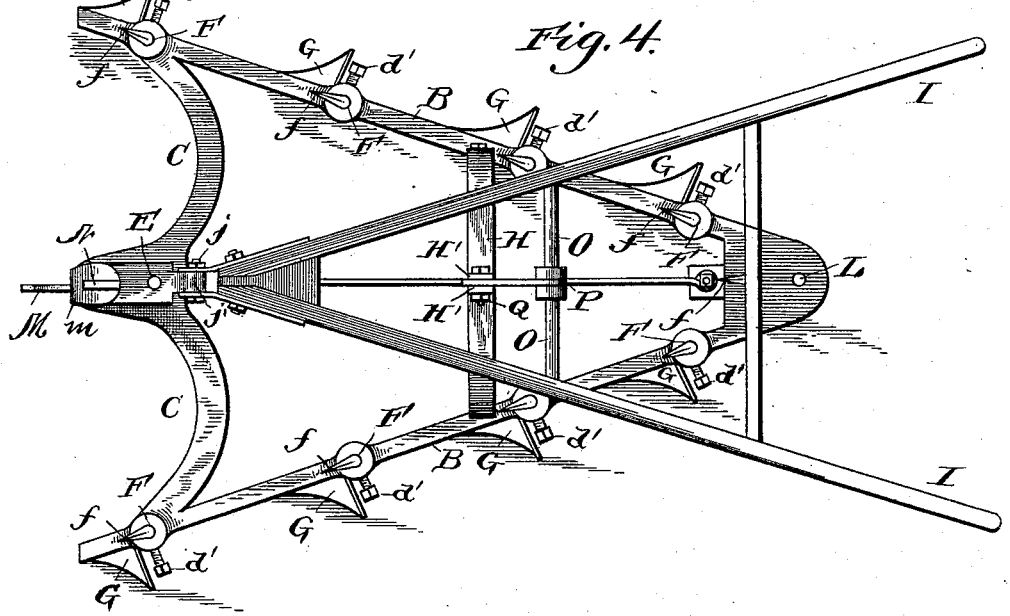

In the drawings, Figure 1 is a perspective view of an implement embodying my invention. Fig. 2 is a vertical longitudinal sectional view thereof. Fig. 3 is a similar view showing the device adapted as a harrow. Fig. 4 is a top or plan view. Fig. 5 is a detail perspective view illustrating the device for adjusting and reversing the handles. Figs. 6, 7, 8, and 9 are similar views of different forms of shovels which may be employed. Fig. 10 is a top or plan view, partly in section, illustrating a modification in the construction of the frame.

Corresponding parts in the figures are denoted by the same letters of reference.

Referring to the drawings, A designates the frame of the device, which is approximately triangular in shape and preferably cast or otherwise constructed of metal. The frame comprises two beams B B, intersecting each other at one end and diverging therefrom. The free ends of the beams are connected by an approximately-U-shaped cross-piece C, having its central arm $c$ projecting outwardly from the frame and in longitudinal alignment therewith. The beams B are provided at equidistant points throughout their length with circular enlargements D, having each a vertical bore $d$ and a binding-screw $d'$. The arm $c$ and the apex of the frame A are provided with vertical bores E E, surrounded upon the under side of the frame with an annular flange $e$ $e$, through which is passed a binding-screw $e'$. The bores $d$ and E form sockets for tool-standards F. The latter are pointed at one end, as shown at $f$, to provide harrow-teeth, while at the opposite end they are each recessed and provided with a bolt-aperture $f'$. Shovels G are adapted to be secured to said ends by bolts $g$, and upon the threaded ends of the bolts are placed binding-nuts $g'$.

About midway of the beams B are provided upwardly-projecting lugs $h$ $h$, to which are bolted the lower ends of inwardly-projecting bars H H. The latter at their opposing ends are formed with upwardly-projecting parallel extensions H' H', provided with transverse coincident apertures $h'$.

I designates the handles, which are connected together at their lower ends, from which point they diverge. To the opposite sides of the lower end of the handles are bolted plates $i$ $i$, extending beyond said end and provided in the extensions with coincident apertures $i'$ $i'$. To said plates is pivotally secured a plate J. The latter is formed at its inner end with a bearing-eye $j$, through which and the apertures $i'$ is passed a bearing-bolt $j'$. The plate J is further provided with apertures $j^2$ $j^3$, adapted to respectively coincide with one of the bores E and with one of two apertures L L, provided at the ends of the frame. A clevis M is formed with a yoke $m$, designed to embrace the end of the frame to which it is attached, and also the outer end of the plate J. This yoke has two coincident apertures $m'$, which register with the apertures $j^3$ and L, and through all of which is passed a clevis-pin N. By reason of the construction just described it will be obvious that the clevis and handles are reversible, whereby the implement may be drawn from either end.

To effect vertical adjustment of the handles and also to permit the same to be reversed, a bar O is provided, said bar having its ends disposed in sockets $o$ $o$, formed therefor in the handles. The bar O carries a centrally-disposed arm P, projecting from one side of the bar and at right angles thereto. The arm P is provided with a longitudinally-arranged slot $p$, through which and two coincident apertures in the extensions H' is passed a binding-bolt Q. Thus to adjust the handles vertically the bolt Q is loosened and the handles elevated or lowered, during which movement said bolt is adapted to play in the slot. When the handles have been adjusted as desired, the bolt Q is then again tightened and serves to retain the parts in position. When greater adjustment of the handle is desired than can be effected in this manner, the bolt Q is removed and placed in the higher or lower pair of apertures in the extensions H'.

The operation and advantages of my invention will be readily understood by those skilled in the art to which it appertains. By means of the construction above described the tools can be changed and reversed in any desired manner, as well as the draft appliances, thus rendering a single implement capable of the uses to which several are generally employed.

In lieu of the solid construction of frame, as above described, a sectional frame, such as shown in Fig. 10, may be employed. In this instance a front block R is provided having two offsets $r\ r$. To the latter are pivotally secured by bolts the opposing ends of the beams B B. The cross-piece C is provided at its ends with cuffs S S, adapted to embrace the free ends of the beams B, said cuffs carrying binding-screws $s\ s$. To prevent displacement, the cuffs are provided on their inner sides with serrations $s'$, adapted to engage similar serrations $s^2$ on the opposing sides of the beams B.

I claim as my invention—

1. In an implement of the class described, the combination, with a frame provided with parallel uprights, of handles carrying at their lower ends a coupling-plate adapted to be attached at either end of the frame, a transverse bar intersecting the handles and provided with a centrally-disposed plate with a longitudinally-arranged slot, and a binding-bolt passing through said slot and the uprights, substantially as and for the purpose set forth.

2. In an implement of the class described, the combination, with the frame provided at each end with an aperture, of a plate provided with an aperture adapted to coincide with one of the first-mentioned apertures, said plate carrying handles, a clevis provided with an apertured yoke adapted to embrace the frame end and the plate, a clevis-pin passing through the registering apertures and securing the clevis and plate to the frame, and means for effecting vertical adjustment of the handles, substantially as and for the purpose set forth.

In testimony whereof I affix my signature in presence of two witnesses.

NATHAN P. LEWIS.

Witnesses:
J. H. DAVIS,
JAMES O'CAVANAGH.